(12) United States Patent
Zhu et al.

(10) Patent No.: US 9,367,733 B2
(45) Date of Patent: Jun. 14, 2016

(54) METHOD AND APPARATUS FOR DETECTING PEOPLE BY A SURVEILLANCE SYSTEM

(71) Applicant: Pelco, Inc., Clovis, CA (US)

(72) Inventors: Hongwei Zhu, Fresno, CA (US); Lei Wang, Clovis, CA (US); Farzin Aghdasi, Clovis, CA (US); Greg M. Millar, Coarsegold, CA (US)

(73) Assignee: Pelco, Inc., Clovis, CA (US)

( * ) Notice: Subject to any disclaimer, the term of this patent is extended or adjusted under 35 U.S.C. 154(b) by 462 days.

(21) Appl. No.: 13/683,977

(22) Filed: Nov. 21, 2012

(65) Prior Publication Data

US 2014/0139660 A1    May 22, 2014

(51) Int. Cl.
| | |
|---|---|
| *G06K 9/34* | (2006.01) |
| *G06K 9/00* | (2006.01) |
| *G06K 9/62* | (2006.01) |
| *G06K 9/48* | (2006.01) |

(52) U.S. Cl.
CPC ........ *G06K 9/00362* (2013.01); *G06K 9/00369* (2013.01); *G06K 9/00771* (2013.01); *G06K 9/34* (2013.01); *G06K 9/48* (2013.01); *G06K 9/6267* (2013.01)

(58) Field of Classification Search
None
See application file for complete search history.

(56) References Cited

U.S. PATENT DOCUMENTS

| | | | |
|---|---|---|---|
| 7,003,136 | B1 | 2/2006 | Harville |
| 7,359,555 | B2 | 4/2008 | Porikli et al. |
| 7,391,907 | B1 * | 6/2008 | Venetianer et al. ........... 382/224 |
| 7,602,944 | B2 | 10/2009 | Campbell et al. |
| 7,787,656 | B2 | 8/2010 | Chen |
| 7,965,866 | B2 | 6/2011 | Wang et al. |
| 8,107,676 | B2 | 1/2012 | Senior |
| 8,238,607 | B2 | 8/2012 | Wang et al. |
| 8,306,265 | B2 | 11/2012 | Fry et al. |
| 8,542,879 | B1 | 9/2013 | Nechyba et al. |

(Continued)

FOREIGN PATENT DOCUMENTS

| | | |
|---|---|---|
| WO | WO 2014/081688 A1 | 11/2013 |
| WO | WO 2014/081687 A1 | 5/2014 |
| WO | WO 2014/151303 A1 | 9/2014 |

OTHER PUBLICATIONS

Digital Image Processing Principles and Applications Gregory A Baxes (1994).*

(Continued)

*Primary Examiner* — Siamak Harandi
*Assistant Examiner* — Narek Zohrabyan
(74) *Attorney, Agent, or Firm* — Hamilton, Brook, Smith & Reynolds, P.C.

(57) ABSTRACT

Surveillance systems may be found in both private and public spaces. In private spaces, they can be designed to help provide and monitor secure premises. Similarly, public spaces may also use surveillance systems to determine an allocation of public resources. A camera surveillance system according to an embodiment of the invention uses advanced image processing techniques to determine whether an object moving across a scene is a person. The camera surveillance system achieves an accurate and efficient classification by selectively processing a set of features associated with the object, such as features that define an omega shape. By selectively processing the set of features associated with the object, the methods and systems described herein reduce the computational complexity of standard image processing/object detection techniques.

16 Claims, 10 Drawing Sheets

(56) References Cited

U.S. PATENT DOCUMENTS

| | | | |
|---|---|---|---|
| 8,600,108 | B2 | 12/2013 | Tang et al. |
| 8,639,020 | B1 | 1/2014 | Kutliroff et al. |
| 8,744,125 | B2 | 6/2014 | Zhu et al. |
| 8,769,557 | B1 | 7/2014 | Terrazas |
| 9,001,199 | B2 | 4/2015 | Sinha et al. |
| 9,076,065 | B1 | 7/2015 | Vijayanarasimhan |
| 2003/0107649 | A1 | 6/2003 | Flickner et al. |
| 2003/0152267 | A1 | 8/2003 | Pirim |
| 2003/0169906 | A1 | 9/2003 | Gokturk et al. |
| 2003/0235341 | A1 | 12/2003 | Gokturk et al. |
| 2005/0111737 | A1 | 5/2005 | Das et al. |
| 2006/0115116 | A1* | 6/2006 | Iwasaki et al. ............ 382/103 |
| 2006/0285724 | A1* | 12/2006 | Tian ............................ 382/103 |
| 2007/0019073 | A1 | 1/2007 | Comaniciu et al. |
| 2007/0047837 | A1 | 3/2007 | Schwab et al. |
| 2007/0098222 | A1 | 5/2007 | Porter et al. |
| 2008/0166045 | A1 | 7/2008 | Xu et al. |
| 2008/0285802 | A1 | 11/2008 | Bramblet et al. |
| 2009/0244291 | A1 | 10/2009 | Saptharishi et al. |
| 2010/0027875 | A1 | 2/2010 | Hampapur et al. |
| 2010/0066761 | A1 | 3/2010 | Tousch et al. |
| 2010/0124357 | A1 | 5/2010 | Hampapur et al. |
| 2010/0266175 | A1 | 10/2010 | Seung et al. |
| 2010/0274746 | A1 | 10/2010 | Rickert et al. |
| 2010/0290700 | A1 | 11/2010 | Yokono |
| 2010/0329544 | A1 | 12/2010 | Sabe et al. |
| 2011/0026770 | A1 | 2/2011 | Brookshire |
| 2011/0058708 | A1* | 3/2011 | Ikenoue .................... 382/103 |
| 2011/0078133 | A1 | 3/2011 | Bordawekar et al. |
| 2011/0080336 | A1 | 4/2011 | Leyvand et al. |
| 2011/0093427 | A1 | 4/2011 | Waite |
| 2011/0143779 | A1 | 6/2011 | Rowe et al. |
| 2011/0176000 | A1 | 7/2011 | Budge et al. |
| 2011/0176025 | A1 | 7/2011 | Anabuki |
| 2011/0202310 | A1 | 8/2011 | Min et al. |
| 2011/0254950 | A1 | 10/2011 | Bibby et al. |
| 2011/0268321 | A1 | 11/2011 | Hosoi |
| 2011/0293136 | A1 | 12/2011 | Porikli |
| 2011/0293180 | A1 | 12/2011 | Criminisi et al. |
| 2012/0027252 | A1 | 2/2012 | Liu et al. |
| 2012/0027263 | A1 | 2/2012 | Liu et al. |
| 2012/0051588 | A1 | 3/2012 | McEldowney |
| 2012/0086780 | A1 | 4/2012 | Sharma et al. |
| 2012/0087572 | A1 | 4/2012 | Dedeoglu et al. |
| 2012/0087575 | A1 | 4/2012 | Winn et al. |
| 2012/0117084 | A1 | 5/2012 | Tang et al. |
| 2012/0120196 | A1 | 5/2012 | Tsai et al. |
| 2012/0128208 | A1 | 5/2012 | Leyvand et al. |
| 2012/0148093 | A1 | 6/2012 | Sharma |
| 2012/0154373 | A1 | 6/2012 | Finocchio et al. |
| 2012/0154542 | A1 | 6/2012 | Katz et al. |
| 2012/0269384 | A1 | 10/2012 | Jones et al. |
| 2013/0128034 | A1 | 5/2013 | Carr |
| 2013/0156299 | A1 | 6/2013 | Zhang et al. |
| 2013/0169822 | A1* | 7/2013 | Zhu et al. ................... 348/180 |
| 2013/0170696 | A1* | 7/2013 | Zhu et al. ................... 382/103 |
| 2013/0182114 | A1 | 7/2013 | Zhang et al. |
| 2013/0182904 | A1 | 7/2013 | Zhang et al. |
| 2013/0182905 | A1 | 7/2013 | Myers et al. |
| 2013/0184592 | A1 | 7/2013 | Venetianer et al. |
| 2013/0205314 | A1 | 8/2013 | Ramaswamy et al. |
| 2013/0287257 | A1 | 10/2013 | Dedhia et al. |
| 2014/0055610 | A1* | 2/2014 | Ko et al. .................... 348/143 |
| 2014/0071242 | A1 | 3/2014 | Lin et al. |
| 2014/0139633 | A1 | 5/2014 | Wang et al. |
| 2014/0169663 | A1 | 6/2014 | Han et al. |
| 2014/0198947 | A1 | 7/2014 | Xu et al. |
| 2014/0270358 | A1 | 9/2014 | Zhu et al. |
| 2014/0270483 | A1 | 9/2014 | Lucey et al. |
| 2014/0285717 | A1* | 9/2014 | Cai ............................. 348/571 |
| 2014/0333775 | A1 | 11/2014 | Naikal et al. |
| 2015/0049906 | A1 | 2/2015 | Fu et al. |
| 2015/0154453 | A1 | 6/2015 | Wilf |

OTHER PUBLICATIONS

Cisco Video Surveillance 2900 Series Standard Definition IP PTZ Cameras, Product Specifications, Author Unknown, Apr. 2011.*

Anonymous, "Spectra® HD Series IP Dome System High Definition Pan/Tilt/Zoom High-Speed Dome", Pelco, Inc., Clovis, CA (2012).

Choi, W., et al., "Detecting and Tracking People using an RGB-D Camera via Multiple Detector Fusion", *2011 IEEE Int'l Conf on Computer Vision Workshops*, pp. 1076-1083, (Nov. 6, 2011).

Choudri, S., et al., "Robust Background Model for Pixel Based People Counting using a Single Uncalibrated Camera", *2009 Twelfth IEEE Int'l Workshop on Performance Evaluation of Tracking and Surveillance (Pets-Winter)*, 8 pages, (Dec. 7, 2009).

Fu, H., et al., "Real-time Accurate Crowd Counting Based on RGB-D Information", *2012 19th IEEE Int'l Conf. on Image Processing*, pp. 2685-2688, (Sep. 30, 2012).

Janoch, A., et al., "The Berkeley 3D Object Dataset (Technical Report No. UCB/EECS-2012-85)", University of California at Berkeley, Electrical Engineering and Computer Sciences (2012).

Notification of Transmittal of the International Search Report and The Written Opinion of the International Searching Authority, or the Declaration, PCT/US2013/070688, "Method and System for Counting People Using Depth Sensor", dated May 12, 2014.

Spincllo, L., et al., "People Detection in RGB-D Data", *2011 IEEE/RSJ Int'l Conf on Intelligent Robots and Systems (IROS)*, pp. 3838-3843, (Sep. 25, 2011).

Tang, S., et al., "Histogram of Oriented Normal Vectors for Object Recognition with a Depth Sensor", *The 11th Asian Conference on Computer Vision*, Daejeon, Korea (2012).

Teichman, A. and Thrun, S., "Tracking-based semi-supervised learning", *The International Journal of Robotics Research*, 31(7):804-818, Stanford University. (2012).

Fernandez-Carbajales, V., et al., "Robust People Detection by Fusion of Evidence from Multiple Methods", *Ninth Int'l Workshop on Image Analysis for Multimedia Interactive Services, IEEE Computer Society*, pp. 55-58 (May 7, 2008).

Fardi, B., et al., "Obstacle Detection and Pedestrian Recognition Using a 3D PMD Camera", *Intelligent Vehicles Symposium 2006 IEEE*, pp. 225-230 (Jun. 13, 2006).

Garcia, A., et al., "Event detection for the TRECVID 2009 video surveillance dataset: the VPULab-UAM contribution", *Video Processing and Understanding Lab, Universidad Autonoma De Madrid, Technical Report SemanticVideo.TR.2009.02*, 13 pages. (2009).

Haritaoglu, I., et al., "W4: Real-Time Surveillance of People and Their Activities", *IEEE Transactions on Pattern Analysis and Machine Intelligence*, vol. 22, No. 8, pp. 809-830 (Aug. 2000).

Li, M., et al., "Rapid and Robust Human Detection and Tracking Based on Omega-Shape Features", *2009 16th IEEE Int'l Conference on Image Processing*, pp. 2545-2548 (Nov. 7, 2009).

Notification of Transmittal of the International Search Report and the Written Opinion of the International Searching Authority, or the Declaration, PCT/US2013/070691, "Method and Apparatus for Detecting People by a Surveillance System", date of mailing May 12, 2014.

Celik, H., "Dominant Object Detection for Autonomous Vision-Based Surveillance", *Ph.D. Thesis*, pp. 1-165 (Feb. 15, 2010).

Notification of Transmittal of the International Search Report and the Written Opinion of the International Searching Authority, or the Declaration, PCT/US2014/025408, "Online Learning System for People Detection and Counting", date of mailing Jul. 10, 2014.

International Preliminary Report on Patentability for International Application No. PCT/US2013/070691, entitled "Method and Apparatus for Detecting People by a Surveillance System," Date of issuance: May 26, 2015.

Zeng et al., "Robust Head-Shoulder detection by PCA-Based Multi-level HOG-LBP Detector For People Counting," IEEE International Conference on Pattern Recognition, (2010).

Li et al., Estimating the Number of People in Crowded Scenes by MID Based Foreground Segmentation and Head-Shoulder Detection, ICPR, (2008).

Gaikwad et al., "New Improved Methodology For Pedestrian Detection in Advanced Driver Assistance System," IJCA, (2012).

* cited by examiner

OBJECT

FIG. 3A

FOREGROUND BLOB

FIG. 3B

CONTOUR OF THE BLOB

CHAIN CODES: 0070076654444432221

HISTOGRAM OF CHAIN CODES

FIG. 5B

DIRECTIONAL ASPECT RATIO

FIG. 10

METHOD AND APPARATUS FOR DETECTING PEOPLE BY A SURVEILLANCE SYSTEM

BACKGROUND

Methods for detecting people in video surveillance systems can be done visually by a human or automatically by a computer. An example of an automated technique includes facial recognition, which can be used to distinguish a person from an inanimate object or an animal, or can be used to determine the identity of an individual.

SUMMARY

A method for detecting people by a surveillance system according to an example embodiment of the present invention includes identifying a foreground contour shape within a scene and a track of the foreground contour shape from at least two frames in a video file. The method may further include determining features of the foreground contour shape within the scene and the track of the foreground contour shape. The surveillance system may also classify at least a portion of the foreground contour shape using a shape feature and the track of the foreground contour shape to determine whether the foreground contour shape matches a person reference model.

To determine if the contour shape matches the person reference model, the system may detect a head and shoulder shape. The system may further apply an omega (i.e., omega shape ($\Omega$)) classifier to the head and shoulder shape to determine whether a fit exists, which can be used to classify a shape of a human as opposed to, for example, a shape of an animal, such as a dog.

The process of detecting people can further include an application of an intra-frame local detector to the foreground contour shape to determine whether the foreground contour shape matches the person reference model. Depending on the implementation, the surveillance system may identify a plurality of foreground contour shapes within the scene and a plurality of tracks associated with each one of the plurality of foreground contour shapes in the video file. The method may further assign a plurality of intra-frame local detectors to visited scene locations. The assigned plurality of intra-frame detectors may be further applied to each one of the visited scene locations to determine whether each one of the foreground contour shapes matches the person reference model.

To perform detection, the method may conduct feature extraction. For example, features may be extracted from the foreground object(s) within the scene or multiple foreground objects within a scene. The features extracted from the foreground object may include, but are not limited to, an object shape, object size, object height, object width, aspect ratio, directional aspect ratio of salient moving direction, head-shoulder feature, aspect ratio of object shape and histogram for chain codes of object shape. Other features, such as salient moving directions and a directional aspect ratio, may also be extracted from the track of the foreground contour shape in the video file. From these example features, the method may determine an expected movement from the track of the foreground shape and propagate features of the track of the foreground contour shape for use in determining whether the object moves in a manner consistent with movements that are expected of or possible by a person.

The method may also identify chain codes defining a perimeter of the foreground contour shape. From these chain codes, a determination of the object shape and object size from the chain codes may be made. The determination of the object shape and object size may be further classified to determine whether the foreground contour shape matches a person reference model.

A surveillance system may include a camera configured to capture image data from a scene. The surveillance system may also include a scene analyzer/scene analyzer server in communication with the camera, configured to receive image data of the scene. The scene analyzer may identify a foreground contour shape within a scene and a track of the foreground contour shape from at least two frames in a video file. In one embodiment, the scene analyzer determines features of the foreground contour shape within the scene and the tracks of the foreground contour shape. Scene analyzer may classify at least a portion of the foreground contour shape using a shape feature and the track of the foreground contour shape to determine whether the foreground contour shape matches a person reference model. The surveillance system may further include a reporting device and/or display device configured to present analysis results from the scene analyzer through a user interface.

In one embodiment, the camera is a fixed surveillance camera. The camera may be configured to support at least two customizable simultaneous video streams. The scene analyzer may be configured to customize a high bit rate stream, according to intra-frame local detector instructions, and apply the intra-frame local detector to the foreground contour shape to determine whether the foreground contour shape matches the person reference model.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

DETAILED DESCRIPTION

A description of embodiments follows.

Figure 1:
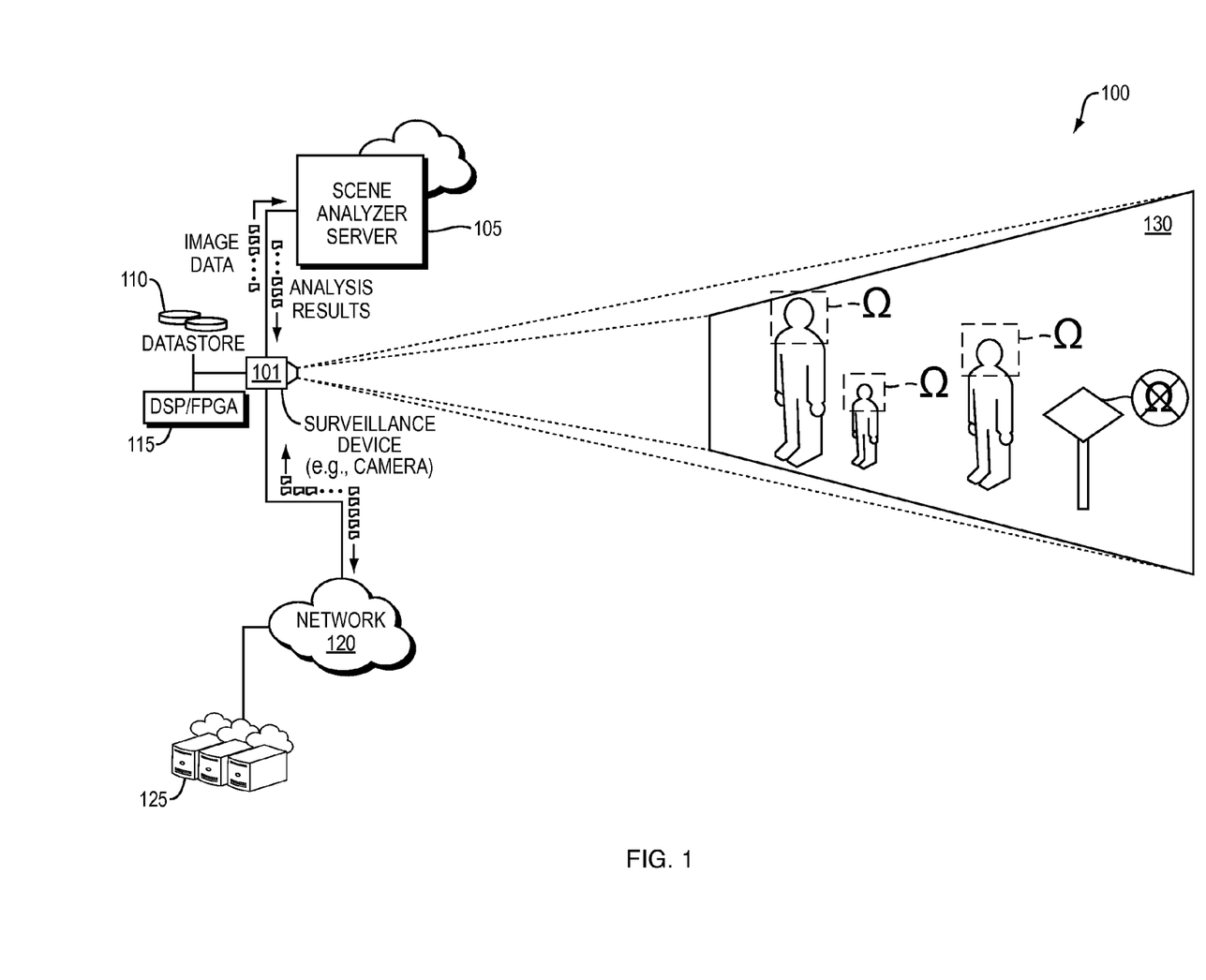
FIG. 1 is a schematic diagram illustrating a surveillance device for detecting people according to one embodiment.

FIG. 1 is a schematic diagram 100 illustrating a surveillance device for detecting people according to one embodiment. As illustrated in FIG. 1, a surveillance device 101 is in communication with a data store 110, digital signal processor (DSP)/field programmable gate array (FPGA) 115, network 120, one or more servers 125, and scene analyzer server 105. The surveillance device is also depicted capturing a scene 130. The surveillance device may include one or more cameras, and each camera may have 1.2 Megapixel or better resolution with the ability to capture approximately 30 images per second or more.

The data store may include one or more database(s) stored in a single data center or across a plurality of geographically distributed servers. The DSP/FPGA may include any standard processor and/or may include one or more graphical processing units dedicated to graphics processing. As illustrated in FIG. 1, the camera may be in wired or wireless communication with the scene analyzer server 105, sending and receiving image data and analysis results. One or more other servers (not shown) may further store image data and additionally process the image data and analysis results.

The scene analyzer server may receive image data from the camera and determine whether an object has been detected, and, if so, determine if that object matches a person reference model. If the object sufficiently matches the person reference model, the scene analyzer may begin to track the object. The advantageous selection of features chosen by the scene analyzer enhances the efficiency and improves the accuracy of object detection.

The camera 101 may be equipped with auto back focus (ABF), H.264 and Motion Joint Photographic Experts Group (MJPEG) compression capability. Motion JPEG is a video codec that compresses each video field (frame) separately into a JPEG image. The resulting quality of video compression is independent from the motion in the image. H.264 is a block-oriented motion-compensation-based codec standard and may be used for High Definition (HD) video distribution. The H.264 compression video files are considerably smaller than other forms of video files, making high definition video more affordable. The camera may further support two simultaneous video streams. The two streams can be compressed in MJPEG and H.264 formats across several resolution configurations. The camera may offer real time video (30 fps) with HD resolution using H.264 compression for optimized bandwidth and storage efficiency. The streams can be configured to be transmitted according to a variety of frame rates, bit rates, and group of pictures (GOP) structures for additional bandwidth administration.

In one embodiment, the camera is SARIX® IXE10LW Series IP camera and may provide advanced low-light performance, wide dynamic range (WDR), and anti-bloom technology. Anti-bloom technology adjusts the image to create the best picture when a bright light source is introduced in a dark scene (e.g., a flashlight, glaring head lights of nighttime traffic or the like). The 1.2 Megapixel network camera may further include a mechanical infra-red cut filter for increased sensitivity in low-light installations, auto back focus and built-in analytics.

Figure 2:
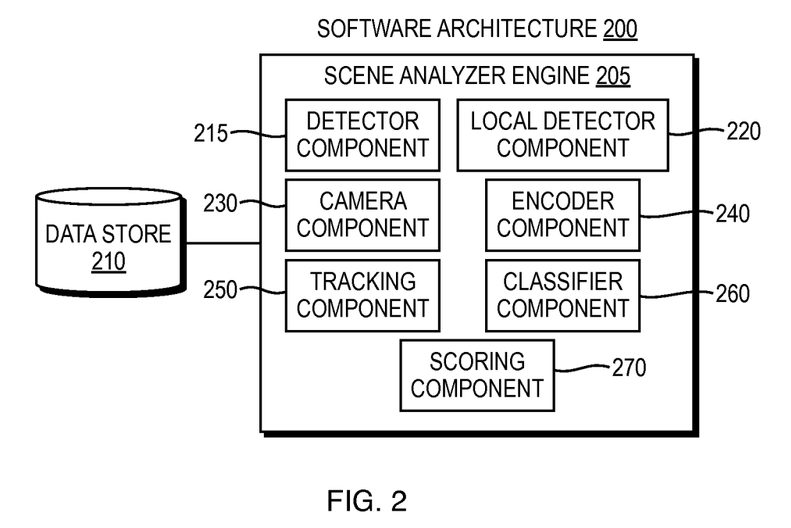
FIG. 2 is a schematic diagram illustrating a software architecture for detecting people according to one embodiment.

FIG. 2 is a schematic diagram illustrating a software architecture 200 for detecting people according to one embodiment. As illustrated in FIG. 2, the software architecture 200 includes a scene analyzer engine 205, data store 210, detector component 215, local detector component 220, camera component 230, encoder component 240, tracking component 250, classifier component 260, and scoring component 270.

The detector component 215 may include an object motion detector and/or one or more local detectors. The local detector component 220 may include a local people detector component. A local people detector includes a set of reference values for each feature of people-type objects. At the beginning of a detection process, no local detector exists for a grid (indicating a location in the scene). The first time an object of people-type visits a grid, the values of the object features are used to initialize reference values of, for example, seven features (except head-shoulder feature), with each reference feature characterized by its average value and average value of variation against the average value. It should be understood that metrics, such as the average value, ma be based on measurements or models of persons expected to be imaged during actual operations of the surveillance camera.

The camera component 230 may initially receive image data from the camera 101 and filter the image to other components in the scene analyzer engine 205. The encoder component 240 may encode image data into one or more formats. For example, the scene analyzer engine 205 may request the encoder to encode image data in a raw format to send to the detector component 215 for determining if motion is detected within a scene. When motion is detected, the scene analyzer engine 205 may request the encoder component 240 to encode the image data into a distinct format for analysis by the local detector component 220.

The tracking component 250 may initialize, generate and/or maintain a track on an object. A track represents a sequence of an object in a camera's field of view from the time that the object first appears to when it disappears, with variant primitives for each frame, including its location in the scene and a set of object features. A tracked object is characterized by its features over time, and the following features are adopted in embodiments of this invention for people detection, which can be derived from a contour of an object. The adopted features may include, but are not limited to, an object shape, object size, object height, object width, aspect ratio, directional aspect ratio of salient moving direction, head-shoulder feature, aspect ratio of object shape, histogram for chain codes of object shape, salient moving directions, and directional aspect ratio, may also be extracted from the track of the foreground contour shape in the video file. In one embodiment, the tracking component 250 may determine an expected movement from the track of the foreground shape and propagate features of the track of the foreground contour shape for use in determining whether the object moves in a manner consistent with movements that are expected of or possible by a person.

The classifier component 260 may include one or more support vector machines (SVM) (not shown) for classifying detected objects. An SVM classifier generally maps data into a high dimensional space and finds a separating hyperplane with a maximal margin. In one embodiment, the classifier component 260 receives representations of detected objects in the image data and maps the representations onto the hyperplane as a person or non-person.

The scoring component 270 may calculate scores associated with one or more objects in a scene. For initialization, an average feature can directly take the value of corresponding feature value of a people-type object that first hits a grid, and standard deviations can be set as a percentage of the average, e.g., 30%. Certainly, such values can be adjusted according to the feature under consideration and application cases. Later on, as other people-type objects visit this grid, each of its reference features are updated automatically by the formula:

$$\overline{f_i}=(1-\alpha)\times\overline{f_i}+\alpha\times f_i, \text{ and } \overline{\sigma_i}=(1-\beta)\times\overline{\sigma_i}+\beta\times|f_i-\overline{f_i}|$$

where $f_i$ stands for the $i^{th}$ feature or count value of any bin in the feature of histogram of chain codes, and $\overline{f_i}$ and $\overline{\sigma_i}$ denote the average value of feature $f_i$ and the average variation between $f_i$ and $\overline{f_i}$ (in a sense of standard variation); $\alpha$ and $\beta$ are two rates in range from 0 to 1, respectively controlling the update speed for each of the reference (average) feature values and their variations against the averages. Typical values of $\alpha$ and $\beta$ are set to 0.01. To determine if an object is people-type using local people detector, an overall score is calculated by summarizing the sub-scores contributed by each of the seven features:

$$score = \sum_i w_i \times score_i$$

where $w_i$ is a weight for the $i^{th}$ feature, and it controls how much this feature impacts the overall score. Sub score $score_i$ for the $i^{th}$ feature is modeled by a Gaussian function $$w_i = e^{-(f_i-\overline{f_i})^2/(2\times\sigma_i^2)},$$

depending on the average values and average variation learned over time.

Figure 3A:
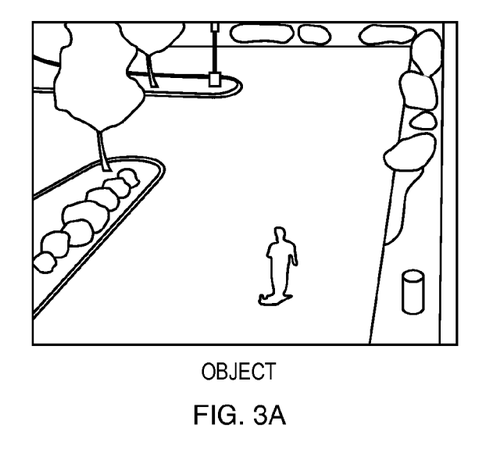
FIG. 3A is a photograph that illustrates a subject in a sample image.

FIG. 3A is a photograph that illustrates a subject in a sample image. As illustrated in FIG. 3A, the subject is a person walking down a paved street. In one embodiment, the person moving across the scene may change in terms of imaging pixel values in the image of the location the person is occupying. This creates a difference between the pixel values prior to the person's occupying the location. From this difference, a foreground blob may be discerned.

Figure 3B:
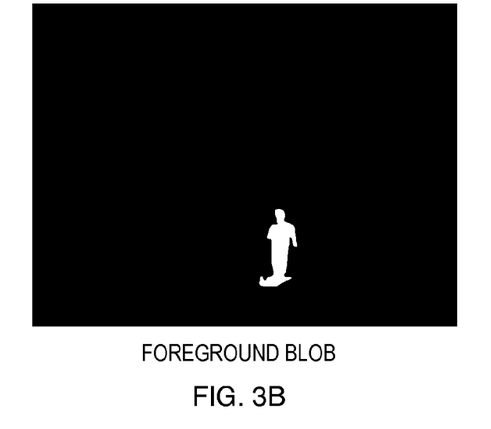
FIG. 3B is a graphical image that illustrates the subject of FIG. 3A represented as foreground blob.

FIG. 3B is a graphical image that illustrates the subject of FIG. 3A represented as foreground blob. The foreground blob may be set against a plain background after application of the background subtraction process. For example, a scene may have a value associated with each pixel. After a given number of frames are received, the pixels may be understood to have a background pixel value. When received frames include pixel values that differ from the background pixel value, the locations of the pixel values differing from the background pixel value may be grouped to form a contour shape.

Figure 3C:
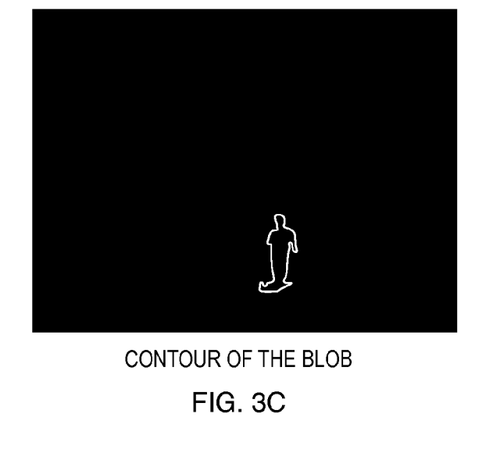
FIG. 3C is a graphical image that illustrates the subject of FIG. 3A represented by a contour shape.

FIG. 3C is a graphical image that illustrates the subject of FIG. 3A represented by a contour shape. The contour shape represents an outline of the set of pixel values differing from the background pixel value. In one embodiment, features associated with the contour shape may be calculated. The calculations of these features may be sent to components of the scene analyzer software for further processing. For example, one feature associated with the contour shape may be a set of direction patterns.

Figure 4A:
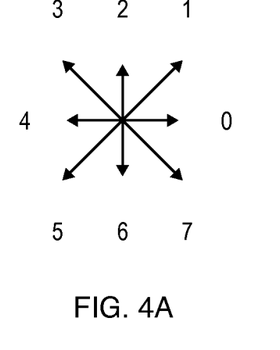
FIG. 4A is a set of direction patterns coded for a plurality of move directions according to one embodiment.

FIG. 4A is a diagram of a set of direction patterns coded for a plurality of move directions according to one embodiment. Direction patterns are coded in FIG. 4A for each of eight move directions, with 0 representing "move to right", 1 "move to top-right", 2 "move to top", 3 "move to top-left", 4 "move to left", 5 "move to bottom-left", 6 "move to bottom", and 7 "move to bottom-right".

Figure 4B:
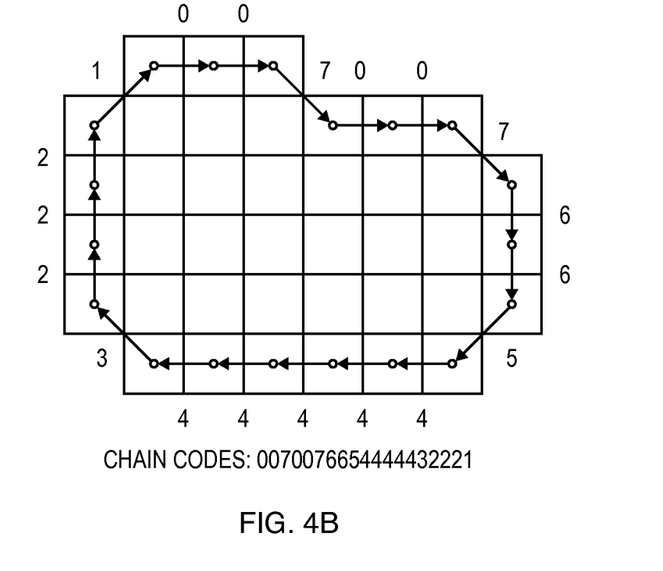
FIG. 4B is a representation of pixels as chain codes according to one embodiment.

FIG. 4B is a representation of pixels as chain codes according to one embodiment. Using the direction codes in FIG. 4A, the object in FIG. 4B with squares denoting its constitute foreground pixels can be represented by chain codes, 00700766544444432221, when the boundary is followed in a clock-wise direction order starting with the most top-left pixel of the object. The chain codes of an object are periodic symbolic representations of the object's shape. Chain codes are a representation of an object contour and are obtained by successively giving relative moves coded by preset direction patterns when an object's boundary is traversed in an enclosed manner.

Figure 5A:
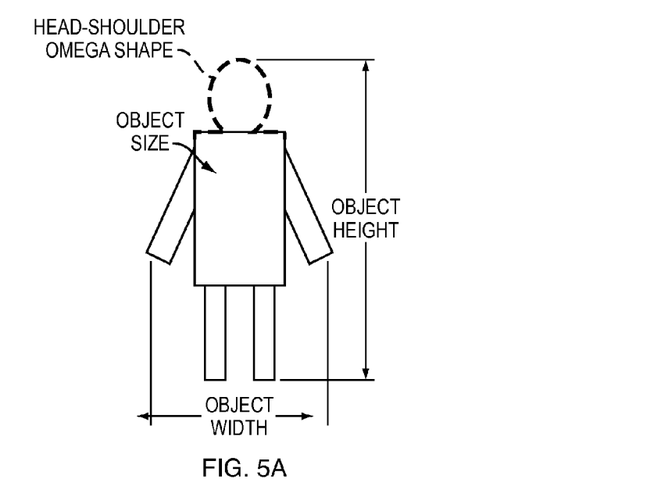
FIG. 5A is a set of features associated with a subject according to one embodiment.

FIG. 5A is a set of features associated with a subject according to one embodiment. As illustrated in FIG. 5A, the subject may have an object size feature. The object size feature may be understood as the area within the enclosed contour of an object. The subject may further include an object height feature. The object height feature may be understood as a subject's length in vertical direction. Another feature which may be associated with the subject is object width. Object width may be understood as a subject's length in the horizontal direction.

Figure 5B:
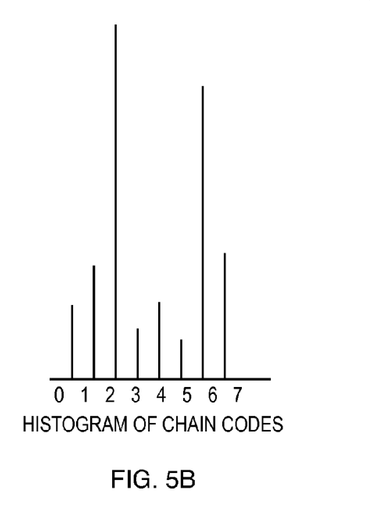
FIG. 5B is a graphical representation of a histogram of chain codes for a subject according to one embodiment.

FIG. 5B is a graphical representation of a histogram of chain codes for a subject according to one embodiment. The histogram of chain codes feature may represent how many times each of the eight direction patterns in FIG. 4A occurs within the chain codes of an object's contour. Another feature that may be associated with the subject is aspect ratio representing the width to height of an object.

Figure 5C:
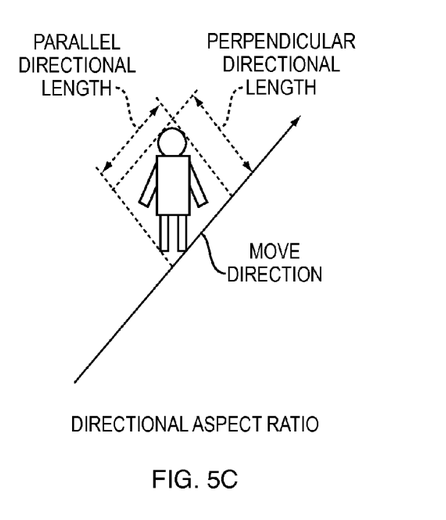
FIG. 5C is a representation of a directional aspect ratio associated with a subject according to one embodiment.

FIG. 5C is a representation of a directional aspect ratio associated with a subject according to one embodiment. A directional aspect ratio may represent the ratio between an object's length in the perpendicular direction and that in the parallel direction of a given direction. Other features (not shown) may also be associated with a subject. In one embodiment, an aspect ratio of object shape may be associated with the subject. The aspect ratio of object shape may be understood as the ratio of accumulated height of object shape versus accumulated width of object shape. Accumulated height is the sum of lengths of chain codes projected into the increasing vertical direction of an enclosed object's contour. Accumulated width is the sum of lengths of chain codes projected into the increasing horizontal direction of an object's contour. Accumulated height and accumulated width can be derived from the histogram of chain codes of an object shape. For example, each chain code 1, 2, 3 contributes one unit length in the calculation of accumulated height, while each of chain codes 0, 1, 7 contributes one unit length in the calculation of accumulated width. Compared to aspect ratio, aspect ratio of object shape takes into account the details of an object's shape rather than just the height and width measured from extreme points.

The subject may also be associated with a head-shoulder feature, the omega-shape pattern of a single person's upper part, indicated by a dotted line of the contour in FIG. 5A.

Figure 6:
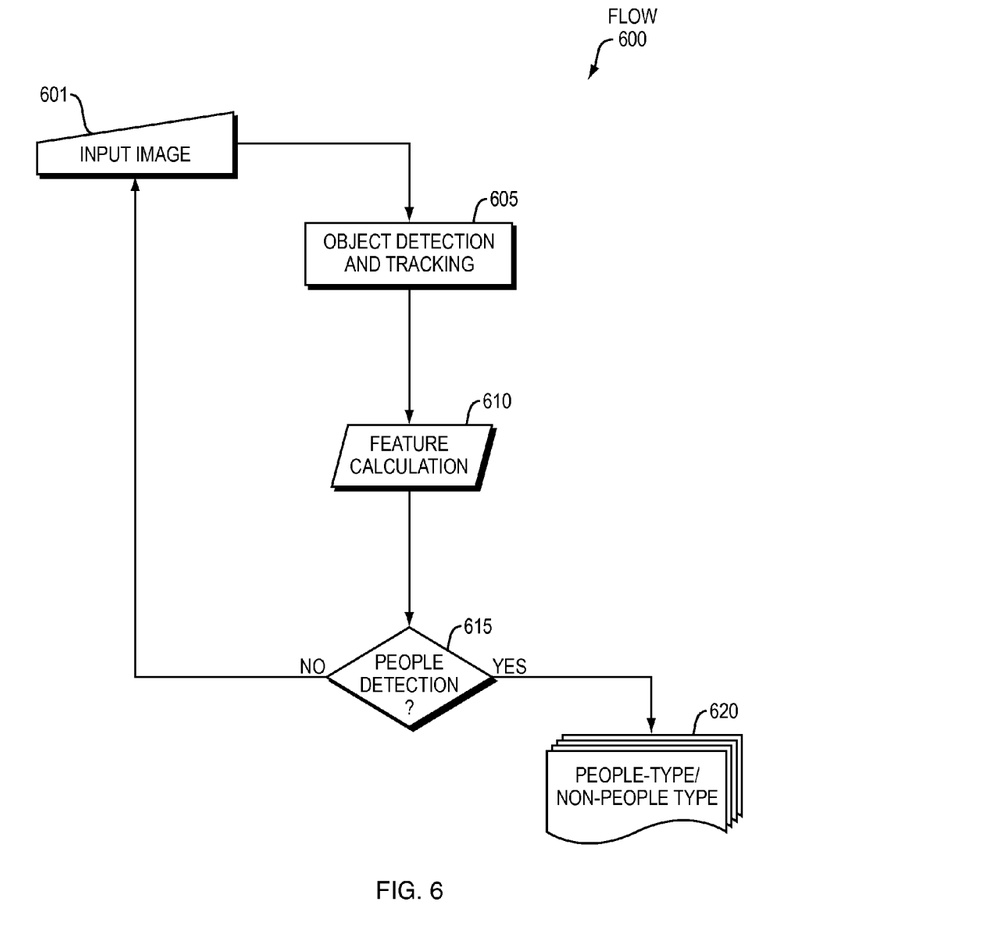
FIG. 6 is a flow diagram illustrating a process flow for detecting people according to one embodiment.

FIG. 6 is a flow diagram illustrating a process flow 600 for detecting people according to one embodiment. The process flow may include receiving an input image 601. The flow may use the image to perform object detection and tracking 605. As FIG. 6 illustrates, the process flow 600 may further include feature calculation 610. Feature calculation may be based on chain codes of a given subject's contour and people detection 615, or classification may consider a plurality of features. In one embodiment, detecting people 615 may include one or more initial and/or secondary checks. The initial check may first determine whether a threshold motion value has been met in a scene. If the threshold motion value has been met, the secondary check may determine if the object causing the threshold motion value qualifies as a people-type.

In one embodiment, each tracked subject may be classified as a people-type or non-people-type 620 by taking into account a combined view of the afore-defined features. This classification may also consider the features of a subject over time. The time interval may begin when the subject appears in a scene and end when the subject no longer appears in the scene. In other embodiments, the time interval may be defined by a number of frames and/or a discrete temporal measure (e.g., seconds, minutes, hours, etc.).

In one embodiment, a confidence measure, referred to herein as "people score," may be defined to indicate a confidence level regarding whether an object is a people-type with the value ranging from 0 to 1. Each tracked object is associated with a people score, which is obtained based on its features and its track history. The larger people score a tracked object has, the more likely the object is a people-type object. As an object moves in the scene, its people score may vary with time. A preset threshold is used to make a decision about whether a tracked object is a people-type or not. Additionally, local people detectors are learned automatically for spatial locations in the scene, each people detector is characterized by a set of reference feature values of people-type objects for a specific location, and these feature values are updated with time whenever a single-person object visits its corresponding location.

A location in the scene may correspond to a pixel in an image or a grid (i.e., a group of neighboring pixels, e.g., pixels in a neighborhood of 4×4 are treated as a grid). Without limitation, locations within a scene may be defined with reference to a cartesian coordinate system. A scene may include two boundaries, a bottom leftmost boundary and a top rightmost boundary. The bottom leftmost boundary may be defined as (0,0), also referred to as the origin, and the top righmost boundary may be defined as (max-x,max-y), where max-x is the leftmost boundary and max-y is the topmost boundary.

In one embodiment, a scene may include one or more locations. Locations may also include two boundaries similar to those associated with a scene, e.g., a bottom leftmost location boundary and a top rightmost location boundary. Scenes and locations may also include indicia for one or more polygonic shapes, e.g., triangle and/or a circle. For example, if a location is circular in shape, the boundaries associated with the circular location can be defined circumferentially with a center of a circle, (x-center, y-center), and a radius, converted into units consistent with the cartesian coordinate plane. In one embodiment, the scenes and locations may be defined by user input devices, e.g., drawing with a stylus and or mouse.

Figure 7:
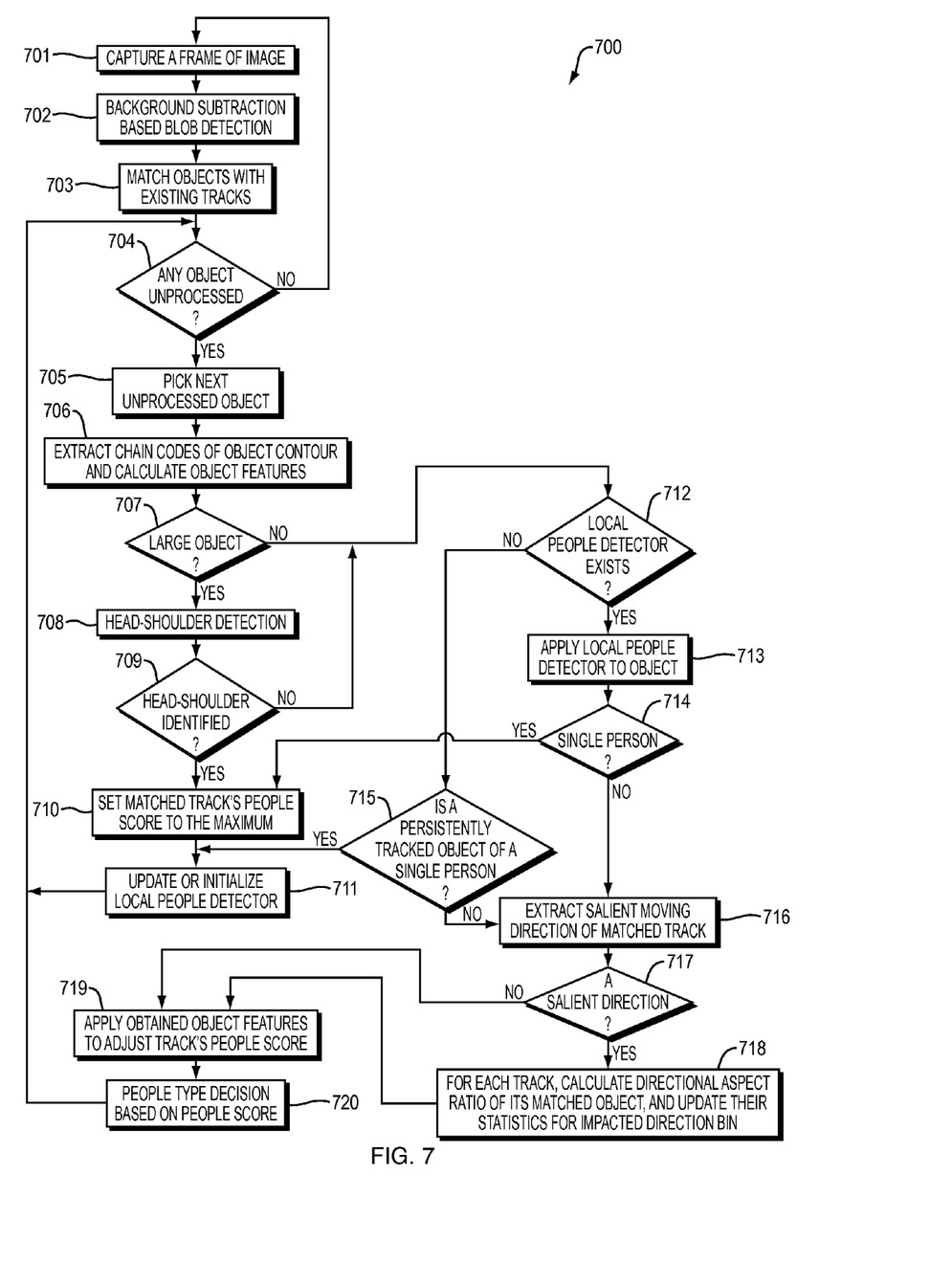
FIG. 7 is a flow diagram illustrating another process flow for detecting people according to one embodiment.

FIG. 7 is a flow diagram illustrating another process flow 700 for detecting people according to one embodiment. The process of detecting people may include capturing a frame of an image 701. A background subtraction 702 approach may be applied to the captured frame to detect foreground/motion pixels of objects appearing in a camera's field of view, and neighboring foreground pixels are grouped using connected components analysis to form object blobs. Any suitable background subtraction methods may be applied to the frame, e.g., Gaussian mixture model, running average, non-parametric model. FIG. 3B provides an example image resulted from background subtraction with bright pixels indicating foreground (motion) pixels and dark pixels for background pixels. Object(s) found at current frame may be matched with existing tracks 703, i.e., previously tracked object(s) which have not disappeared from the camera's scene so far, meaning that for each object found, the process flow 700 matches its track, if possible, and for each existing track found, the process flow 700 finds its matched object at the current frame, if possible. This process referred to herein is "object tracking across successive image frames." Variant tracking approaches can be used, e.g., based on a Kalman filter or particle filter, by taking into account spatial relationships and feature similarities. For obtained objects, the process of people detection is applied to it by operations 706 through 720 and returns to process a next image frame, which is achieved in operations 704 and 705.

For each object blob, its contour is extracted and object features are calculated 706, which results in a list of chain codes being obtained, with each entry corresponding to the contour of an object (e.g., FIG. 3C) appearing in the camera's scene. To obtain chain codes, a scan is carried out on the image of foreground pixels (e.g., FIG. 3B) row by row from top to bottom, in one example embodiment. When a foreground pixel is met, the process of contour following is launched to extract successive moves in a form of the direction pattern codes defined in FIG. 4A for an enclosed travel until the traversal returns to the starting pixel. With chain codes of an object, the object's features are calculated by using their definitions mentioned previously, except for two features: directional aspect ratio and the head-shoulder feature, for reasons described below.

When an object is found to have a large size 707, the process of head-shoulder (HS) feature detection is launched on the object's contour 708, with details described below in reference to FIGS. 8 and 9. If an HS feature is identified 709, the process flow 700 sets the people score of the object's matched track to a preset maximum 710; otherwise, the process flow checks if a local people detector exists based on learned local reference feature values in the location where the object appears 712; if available, the process flow 700 applies it determines if the object is a single person 713 and 714. An object is considered a single person if its features fall in a certain distance from the reference prototype representative in that location through comparing an overall people score to a preset threshold.

When an object is detected as a single person 714 (based on HS detection, or local detector 712 and 713, or according to the propagated object type persistency from a previous person track 715), impacted local detector's features are updated, or initialized if previously not existing 711.

If an object is not identified as a single person based on local people detector (checked in 714), salient moving direction is extracted for each track 716. A salient moving direction is a direction along which a tracked object has moved a significant distance. When a salient direction is identified 717, the process flow 700 divides the 360 degrees of direction into a certain number of direction bins. A bin may hold the means and standard derivations of directional aspect ratio with regard to the direction falling into this bin 718. The means and standard deviations are used to update the people score of the track as the track proceeds 719. A people type decision based on the people score is made 720, and the people score updated in a current frame for a tracked object is further applied to guide people detection coming in image frames for this track.

Figure 8:
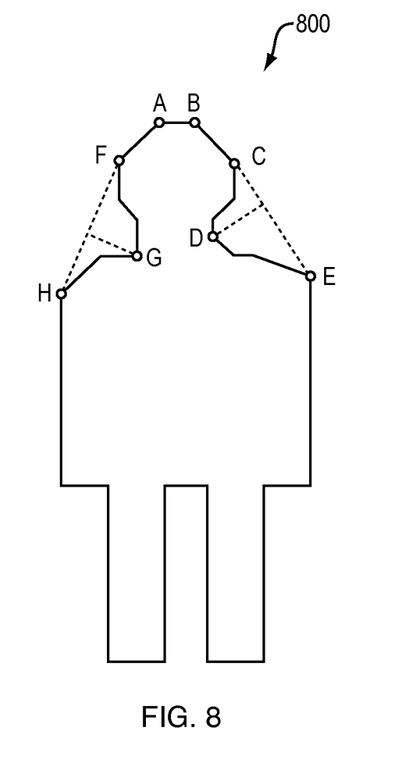
FIG. 8 is a schematic diagram of an identification of an omega shape according to one embodiment.

FIG. 8 is a schematic diagram 800 of an identification of an omega shape according to one embodiment. As indicated in FIG. 8, the head-shoulder feature can be identified by the omega shape of the head shoulder part of a person.

Figure 9:
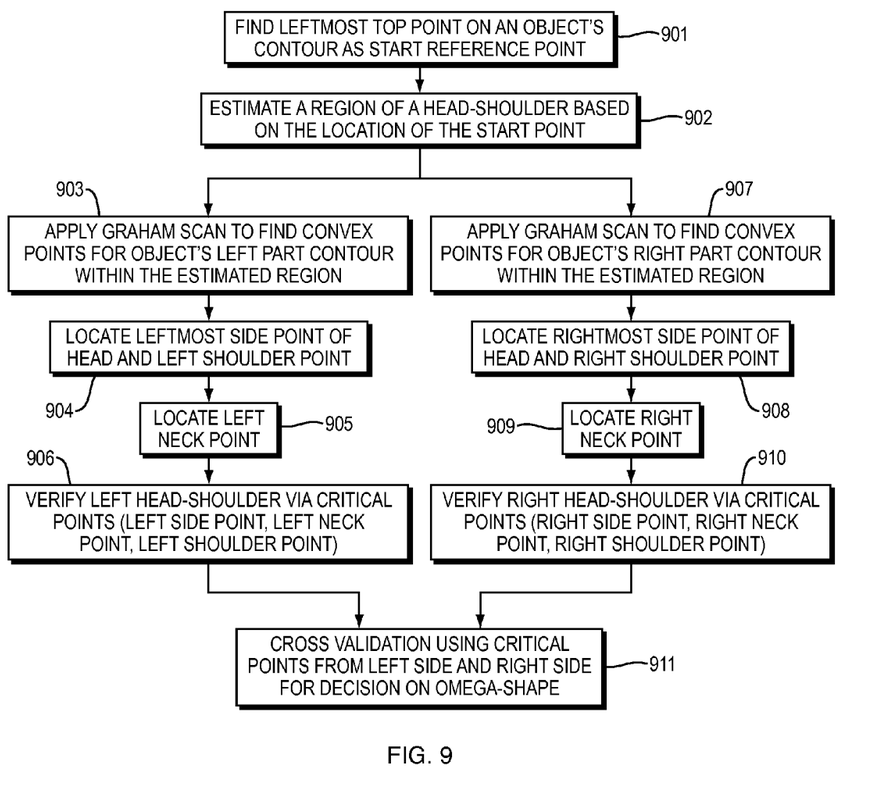
FIG. 9 is a flow diagram illustrating another process flow for detecting an omega shape according to one embodiment.

FIG. 9 is a flow diagram illustrating another process flow for detecting an omega shape according to one embodiment. FIG. 9 illustrates the procedure for omega-shape recognition. Given an object, its leftmost top point (head top point A in FIG. 8) is located (901). By referring to the vertical location (vertical image coordinate) of the head top point, a rectangle region is estimated within which candidate head-shoulder feature is searched via the representation of convex hull of the object's contour (902). Starting from the head-top point, a Graham scan method is used to extract convex-hull points (903) (to obtain points A, F, H on the left side in FIG. 8) and (907) (to obtain points B, C, E on the right side in FIG. 8). With the representation of left convex hull, left head-side point (point F in FIG. 8) and left shoulder point (point H in FIG. 8) can be identified by taking into account the distance and geometrical relation among the convex hull points on the left part (904). Then, the left neck point (point G in FIG. 8) is located by finding the furthest point on the object's contour between the left-side point and left shoulder point (905). These points are further verified 906, by considering the relative locations and distances among head top point A, and left head-side point F, left neck point G, and left shoulder point H. Similarly, the right head-side point, right shoulder point, and right neck point can be located and verified through (907) through (910). If both left head-shoulder and right head-shoulder are verified, they are cross-verified by checking the line distance and direction connecting the two neck points (left neck and right neck points) against the line connecting the two head-side points, and that collecting the two shoulder points. When the points are compliant, a valid omega shape may be confirmed (911).

Figure 10:
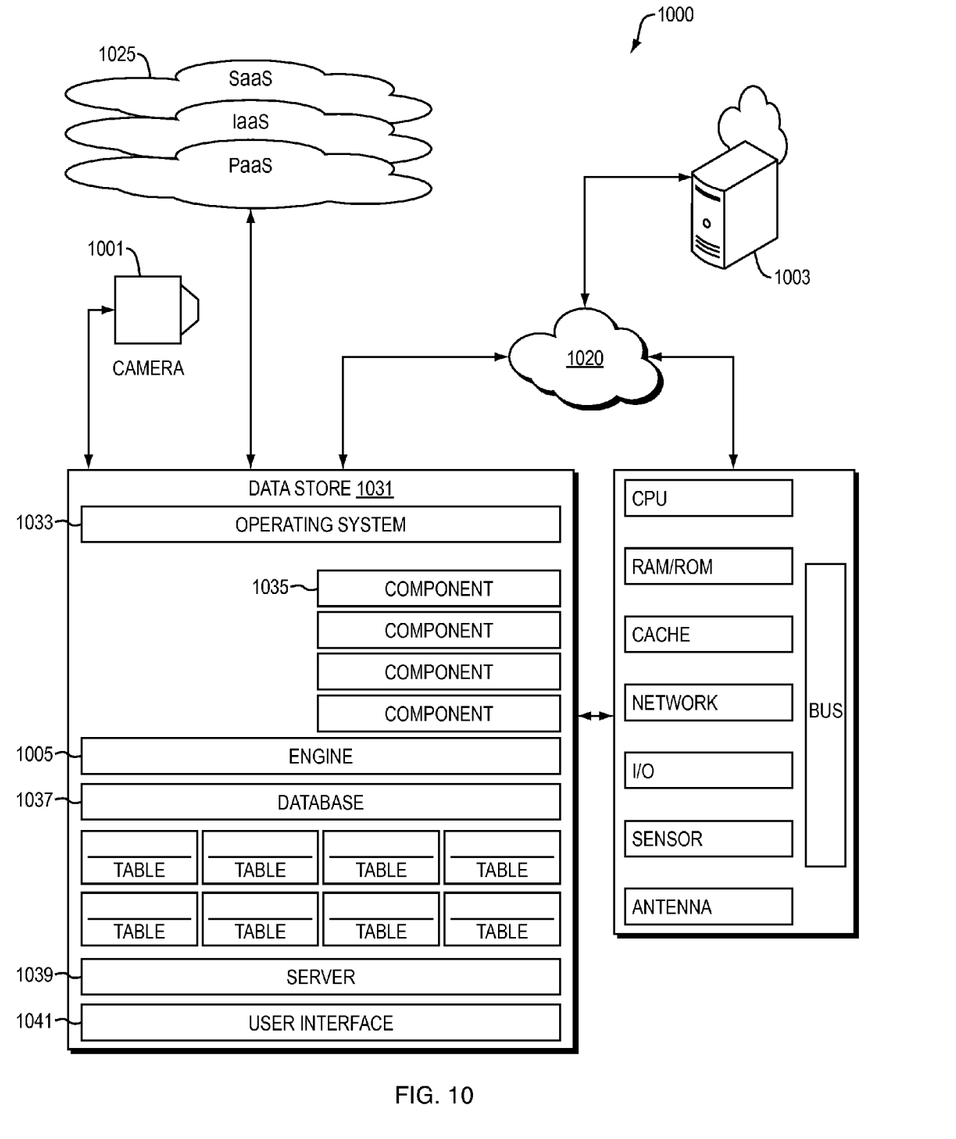
FIG. 10 is a system for detecting people.

FIG. 10 is a block diagram illustrating embodiments of a People Detection (PD) Platform 1000. In this embodiment, the PD Platform may serve to aggregate, process, store, search, serve, identify, instruct, generate, match, and/or facilitate interactions with a computer. Typically, users, which may be people and/or other systems, may engage information technology systems (e.g., computers) to facilitate information processing. In turn, computers employ processors to process information; such processors may be referred to as central processing units (CPU). One form of processor is referred to as a microprocessor. CPUs use communicative circuits to pass binary encoded signals acting as instructions to enable various operations. These instructions may be operational and/or data instructions containing and/or referencing other instructions and data in various processor accessible and operable areas of memory (e.g., registers, cache memory, random access memory, etc.). Information systems may be used to collect data for later retrieval, analysis, and manipulation, which may be facilitated through a database program 1037.

In one embodiment, the PD Platform may be connected to and/or communicate with entities such as, but not limited to: one or more users from user input devices (e.g., Flash/SD/SSD); peripheral devices, e.g., a surveillance device or camera 1001; an optional cryptographic processor device; and/or a communications network 1020.

Networks are commonly thought to comprise the interconnection and interoperation of clients, servers, and intermediary nodes in a graph topology. It should be noted that the term "server" as used throughout this application refers generally to a computer, other device, program, or combination thereof that processes and responds to the requests of remote users across a communications network. Servers 1039 serve their information to requesting "client(s)". The term "client" as used herein refers generally to a computer, program, other device, user and/or combination thereof that is capable of processing and making requests and obtaining and processing any responses from servers across a communications network.

The PD Platform may be based on one or more computer system(s) that may comprise a central processing unit ("CPU(s)" and/or "processor(s)" (these terms are used interchangeable throughout the disclosure unless noted to the contrary)), a memory (e.g., a read only memory (ROM), a random access memory (RAM), Cache etc.), and/or an Input/Output Ports, and may be interconnected and/or communicating through a system bus on one or more (mother)board(s) having conductive and/or otherwise transportive circuit pathways through which instructions (e.g., binary encoded signals) may travel to effectuate communications, operations, storage, etc.

The processor and/or transceivers may be connected as either internal and/or external peripheral devices (e.g., sensors) via the I/O ports. In turn, the transceivers may be connected to antenna(s), thereby effectuating wireless transmission and reception of various communication and/or sensor protocols. For example, a GPS receiver may receive data from one or more satellites in orbit. The satellites transmit satellite information including position information and transmission time (clock information when the satellite transmits a signal to a GPS receiver). The receiver may then compares the time of receipt of the satellite information with the transmission time to determine a distance from the GPS receiver to satellite and, with the use of other satellite distance determinations, the GPS receiver's location may be established. The GPS receiver may be used with other receiver/transceiver chip protocols to increase the accuracy of the position for a camera.

The CPU comprises at least one high-speed data processor adequate to execute program components for executing user and/or system-generated requests. Often, the processors themselves will incorporate various specialized processing units, such as, but not limited to: integrated system (bus) controllers, memory management control units, floating point units, and even specialized processing sub-units like graphics processing units, digital signal processing units, and/or the like. Additionally, processors may include internal fast access addressable memory, and be capable of mapping and addressing memory beyond the processor itself; internal memory may include, but is not limited to: fast registers, various levels of cache memory (e.g., level 1, 2, 3, etc.), RAM, etc.

Depending on the particular implementation, features of the PD Platform may be achieved by implementing a microcontroller. Also, to implement certain features of the PD Platform, some feature implementations may rely on embedded components, such as: Application-Specific Integrated Circuit ("ASIC"), Digital Signal Processing ("DSP"), Field Programmable Gate Array ("FPGA"), and/or the like embedded technology. For example, any of the PD Platform Engine Set 1005 (distributed or otherwise) and/or features may be implemented via the microprocessor and/or via embedded components; e.g., via ASIC, coprocessor, DSP, FPGA, and/or the like. Alternately, some implementations of the PD Platform may be implemented with embedded components that are configured and used to achieve a variety of features or signal processing.

The embedded components may include software solutions, hardware solutions, and/or some combination of both hardware/software solutions. Storage interfaces, e.g., data store 1031, may accept, communicate, and/or connect to a number of storage devices such as, but not limited to: storage devices, removable disc devices, solid state drives (SSD) and/or the like. Storage interfaces may employ connection protocols such as, but not limited to: (Ultra) (Serial) Advanced Technology Attachment (Packet Interface) ((Ultra) (Serial) ATA(PI)), (Enhanced) Integrated Drive Electronics ((E)IDE), Institute of Electrical and Electronics Engineers (IEEE) 1394, fiber channel, Small Computer Systems Interface (SCSI), Universal Serial Bus (USB), and/or the like.

Network card(s) may accept, communicate, and/or connect to a communications network 1020. Through a communications network 1020, the PD Platform is accessible through remote clients (e.g., computers with web browsers) by users. Network interfaces may employ connection protocols such as, but not limited to: direct connect, Ethernet (thick, thin, twisted pair 10/100/1000 Base T, and/or the like), Token Ring, wireless connection such as IEEE 802.11a-x, and/or the like. A cloud service 1025 may be in communication with the PD Platform. The cloud service may include a Platform-as-a-Service (PaaS) model layer, an Infrastructure-as-a-Service (IaaS) model layer and a Software-as-a-Service (SaaS) model layer. The SaaS model layer generally includes software managed and updated by a central location, deployed over the Internet and provided through an access portal. The PaaS model layer generally provides services to develop, test, deploy, host and maintain applications in an integrated development environment. The IaaS layer model generally includes virtualization, virtual machines, e.g., virtual servers, virtual desktops and/or the like.

Input Output interfaces (I/O) may accept, communicate, and/or connect to user input devices, peripheral devices, cryptographic processor devices, and/or the like. The video interface composites information generated by a computer system and generates video signals based on the composited information in a video memory frame. Another output device is a television set, which accepts signals from a video interface. Typically, the video interface provides the composited video information through a video connection interface that accepts a video display interface (e.g., an RCA composite video connector accepting an RCA composite video cable; a DVI connector accepting a DVI display cable, etc.).

User input devices often are a type of peripheral device and may include: card readers, dongles, finger print readers, gloves, graphics tablets, joysticks, keyboards, microphones, mouse (mice), remote controls, retina readers, touch screens (e.g., capacitive, resistive, etc.), trackballs, trackpads, sensors (e.g., accelerometers, ambient light, GPS, gyroscopes, proximity, etc.), styluses, and/or the like.

Peripheral devices may be connected and/or communicate to I/O and/or other facilities of the like such as network interfaces, storage interfaces, directly to the interface bus, system bus, the CPU, and/or the like. Peripheral devices may be external, internal and/or part of PD Platform. Peripheral devices may include: antenna, audio devices (e.g., line-in, line-out, microphone input, speakers, etc.), cameras (e.g., still, video, webcam, etc.), dongles (e.g., for copy protection, ensuring secure transactions with a digital signature, and/or the like), external processors (for added capabilities; e.g., crypto devices), force-feedback devices (e.g., vibrating motors), network interfaces, printers, scanners, storage devices, transceivers (e.g., cellular, GPS, etc.), video devices (e.g., goggles, monitors, etc.), video sources, visors, and/or the like. Peripheral devices often include types of input devices (e.g., cameras). It should be noted that although user input devices and peripheral devices may be employed, the PD Platform may be embodied as an embedded, dedicated, and/or monitor-less (i.e., headless) device, wherein access would be provided over a network interface connection.

Generally, any mechanization and/or embodiment allowing a processor to affect the storage and/or retrieval of information is regarded as memory. It is to be understood that the PD Platform and/or a computer systems may employ various forms of memory. In a typical configuration, memory will include ROM, RAM, and a storage device. A storage device may be any conventional computer system storage. Storage devices may include a (fixed and/or removable) magnetic disk drive; a magneto-optical drive; an optical drive (i.e., Blueray, CD ROM/RAM/Recordable (R)/ReWritable (RW), DVD R/RW, HD DVD R/RW etc.); an array of devices (e.g., Redundant Array of Independent Disks (RAID)); solid state memory devices (USB memory, solid state drives (SSD), etc.); other processor-readable storage mediums; and/or other devices of the like. Thus, a computer system 1003 generally requires and makes use of non-transitory and/or transitory memory.

A user interface component 1041 is a stored program component that is executed by a CPU. The user interface may be a graphical user interface as provided by, with, and/or atop operating systems 1033 and/or operating environments. The user interface may allow for the display, execution, interaction, manipulation, and/or operation of program components and/or system facilities through textual and/or graphical facilities. The user interface provides a facility through which users may affect, interact, and/or operate a computer system. A user interface may communicate to and/or with other components in a component collection, including itself, and/or facilities of the like.

A Web browser component (not shown) is a stored program component that is executed by a CPU. The Web browser may be a conventional hypertext viewing application. Secure Web browsing may be supplied with 128 bit (or greater) encryption by way of HTTPS, SSL, and/or the like. Web browsers allow for the execution of program components through facilities such as ActiveX, AJAX, (D)HTML, FLASH, Java, JavaScript, web browser plug-in APIs (e.g., FireFox, Safari Plug-in, and/or the like APIs), and/or the like. Web browsers and like information access tools may be integrated into mobile devices. A Web browser may communicate to and/or with other components in a component collection, including itself, and/or facilities of the like. The browser may communicate with information servers, operating systems, integrated program components (e.g., plug-ins), and/or the like; e.g., it may contain, communicate, generate, obtain, and/or provide program component, system, user, and/or data communications, requests, and/or responses. Also, in place of a Web browser and information server, a combined application may be developed to perform similar operations of both.

The structure and/or operation of any of the PD Platform may be combined, consolidated, and/or distributed in any number of ways to facilitate development and/or deployment. Similarly, the component collection may be combined in any number of ways to facilitate deployment and/or development. To accomplish this, one may integrate the components into a common code base or in a facility that can dynamically load the components on demand in an integrated fashion. The Engine Set 1005 components may be consolidated and/or distributed in countless variations through standard data processing and/or development techniques. Multiple instances of any one of the program components in the program component collection 1035 may be instantiated on a single node, and/or across numerous nodes to improve performance through load-balancing and/or data-processing techniques. Furthermore, single instances may also be distributed across multiple controllers and/or storage devices; e.g., databases. All program component instances and controllers working in concert may do so through standard data processing communication techniques.

The configuration of the PD Platform will depend on the context of system deployment. Factors such as, but not limited to, the budget, capacity, location, and/or use of the underlying hardware resources may affect deployment requirements and configuration. Regardless of if the configuration results in more consolidated and/or integrated program components, results in a more distributed series of program components, and/or results in some combination between a consolidated and distributed configuration, data may be communicated, obtained, and/or provided. Instances of components consolidated into a common code base from the program component collection may communicate, obtain, and/or provide data. This may be accomplished through intra-application data processing communication techniques such as, but not limited to: data referencing (e.g., pointers), internal messaging, object instance variable communication, shared memory space, variable passing, and/or the like.

In certain embodiments, the procedures, devices, and processes described herein constitute a computer program product, including a computer readable medium, e.g., a removable storage medium such as one or more DVD-ROM's, CD-ROM's, diskettes, tapes, etc., that provides at least a portion of the software instructions for the system. Such a computer program product can be installed by any suitable software installation procedure, as is well known in the art. In another embodiment, at least a portion of the software instructions may also be downloaded over a cable, communication and/or wireless connection.

Embodiments may also be implemented as instructions stored on a non-transitory machine-readable medium, which may be read and executed by one or more processors. A non-transient machine-readable medium may include any mechanism for storing or transmitting information in a form readable by a machine, e.g., a computing device 1003. For example, a non-transient machine-readable medium may include read only memory (ROM); random access memory (RAM); magnetic disk storage media; optical storage media; flash memory devices; and others.

While this invention has been particularly shown and described with references to example embodiments thereof, it will be understood by those skilled in the art that various changes in form and details may be made therein without departing from the scope of the invention encompassed by the appended claims.

What is claimed is:

1. A method for detecting people by a surveillance system, the method comprising:
   identifying a plurality of foreground contour shapes of objects within a scene and a respective track for each of the plurality of foreground contour shapes from at least two frames in a video file;
   determining a plurality of features of the foreground contour shapes within the scene and the tracks of the foreground contour shapes, the features including a set of salient moving directions, and directional aspect ratios;
   assigning a respective intra-frame local detector to each location in the scene visited by the foreground contour shapes; and
   classifying at least a portion of each of the foreground contour shapes by using a feature of the foreground contour shape and the respective track of each foreground contour shape and applying the assigned respective intra-frame detector to the foreground contour shapes of the visited scene locations to determine whether each foreground contour shape matches a person reference model.

2. The method of claim 1, further comprising
   extracting features from the foreground contour shapes within the scene, the features including at least one of the following: an object shape, object size, object height, object width, aspect ratio, directional aspect ratio of salient moving direction, head-shoulder feature, aspect ratio of object shape and histogram for chain codes of object shape.

3. The method of claim 1, further comprising:
   identifying respective chain codes defining a perimeter of the foreground contour shapes;
   determining at least object shape and object size from the respective chain codes; and
   classifying the object shape and object size from the chain codes to determine whether each foreground contour shape matches the person reference model.

4. The method of claim 3, further comprising:
   determining if the calculated object size is large wherein a large object comprises at least 30% of frame size of the video file.

5. The method of claim 1, further comprising:
   extracting salient moving directions from the respective tracks of the foreground contour shapes in the video file;
   extracting respective directional aspect ratios from the tracks of the foreground contour shapes in the video file; and determining whether each foreground contour shape matches the person reference model based on the salient moving directions and the directional aspect ratios.

6. The method of claim 5, further comprising:
   determining a respective expected movement from the respective tracks of the foreground contour shapes, extracted salient moving directions and directional aspect ratios; and
   propagating features of the tracks of the foreground contour shapes.

7. The method of claim 1 wherein determining whether the foreground contour shapes match the person reference model includes detecting a head and shoulder shape.

8. The method of claim 7 wherein detecting a head and shoulder shape includes applying an omega classifier.

9. A non-transitory computer readable medium, the computer readable medium having program instructions stored thereon, the program instructions being executable by a processor, and, when executed by a processor, cause the processor to:
   identify a plurality of foreground contour shapes of objects within a scene and a respective track for each of the plurality of foreground contour shapes from at least two frames in a video file;
   determine a plurality of features of the foreground contour shapes within the scene and the tracks of the foreground contour shapes, the features including a set of salient moving directions, and directional aspect ratios;
   assign a respective intra-frame local detector to each location in the scene visited by the foreground contour shapes; and
   classify at least a portion of each of the foreground contour shapes by using a feature of the foreground contour shape and the respective track of each foreground contour shape and applying the assigned respective intra-frame detector to the foreground contour shapes of the visited scene locations to determine whether each foreground contour shape matches a person reference model.

10. The computer readable medium of claim 9, further including program instructions that when executed by the processor, cause the processor to:
    extract features from the foreground contour shapes within the scene, the features including at least one of the following: an object shape, object size, object height, object width, aspect ratio, directional aspect ratio of salient moving direction, head-shoulder feature, aspect ratio of object shape and histogram for chain codes of object shape.

11. The computer readable medium of claim 9, further including program instructions that when executed by the processor, cause the processor to:
   identify respective chain codes defining a perimeter of the foreground contour shapes;
   determine at least object shape and object size from the respective chain codes; and
   classify the object shape and object size from the chain codes to determine whether each foreground contour shape matches the person reference model.

12. A surveillance system, comprising:
   a camera configured to capture image data from a scene;
   a memory with computer code instructions stored thereon, the memory with one or more processors, and the computer code instructions being configured to cause the system to implement a scene analyzer in communication with the camera and configured to receive image data of the scene, the scene analyzer further configured to:
   identify a plurality of foreground contour shapes of objects within a scene and a respective track for each of the plurality of foreground contour shapes from at least two frames in a video file;
   determine a plurality of features of the foreground contour shapes within the scene and the tracks of the foreground contour shapes, the features including a set of salient moving directions, and directional aspect ratios;
   assign a respective intra-frame local detector to each location in the scene visited by the foreground contour shapes; and
   classify at least a portion of each of the foreground contour shapes by using a feature of the foreground contour shape and the respective track of each foreground contour shape and applying the assigned respective intra-frame detector to the foreground contour shapes of the visited scene locations to determine whether each foreground contour shape matches a person reference model.

13. The surveillance system of claim 12, wherein the camera is a fixed surveillance camera.

14. The surveillance system of claim 12, wherein the camera is configured to support at least two simultaneous video streams.

15. The surveillance system of claim 14, wherein the at least two simultaneous video streams are customizable.

16. The surveillance system of claim 14, wherein the scene analyzer is configured to:
   customize a high bit rate stream according to intra-frame local detector instructions.

* * * * *